United States Patent [19]

Ramunni et al.

[11] Patent Number: 6,017,650
[45] Date of Patent: Jan. 25, 2000

[54] GAS-DIFFUSSION ELECTRODES FOR POLYMERIC MEMBRANE FUEL CELL

[75] Inventors: Enrico Ramunni, S. Donato Milanese, Italy; Manfred Kienberger, Dietzenbach, Germany

[73] Assignee: De Nora S.p.A., Italy

[21] Appl. No.: 09/056,298

[22] Filed: Apr. 7, 1998

[30]    Foreign Application Priority Data

Apr. 18, 1997 [IT] Italy ................................. MI97A0907

[51] Int. Cl.[7] ...................................................... H01M 4/86
[52] U.S. Cl. ................................ 429/42; 429/40; 429/41; 429/44; 204/294
[58] Field of Search .................................. 429/40, 41, 42, 429/44; 204/294

[56]           References Cited

U.S. PATENT DOCUMENTS 4,647,359  3/1987  Lindstrom .................................. 429/42
5,636,437  6/1997  Kaschmitter et al. .................... 29/825
5,783,325  7/1998  Cabasso et al. .......................... 429/42

*Primary Examiner*—Bruce F. Bell
*Attorney, Agent, or Firm*—Bierman, Muserlian and Lucas

[57]           ABSTRACT

The present invention describes an improved electrode suitable for application in solid polymer electrolyte fuel cells, comprising a thin, porous, planar, conductive substrate having one side coated with a pre-layer consisting of conductive carbon having a low surface area mixed to a first hydrophobic agent, to which is applied a catalytic layer consisting of platinum supported on conductive carbon with a high surface area, mixed to a second hydrophobic agent. The hydrophobic degree of the applied layers are suitably adjusted to obtain the best exploitation of the catalyst and to improve the water balance of the process.

13 Claims, No Drawings

GAS-DIFFUSSION ELECTRODES FOR POLYMERIC MEMBRANE FUEL CELL

DESCRIPTION OF THE INVENTION

Fuel cells are apparatuses wherein reaction energy released by the combination of a fuel (e.g. hydrogen or admixtures thereof) with a comburent (e.g. pure oxygen, air, chlorine or bromine) is not completely transformed into thermal energy, but is converted to electric energy, as direct current. In said apparatuses, the fuel is fed to the anode, which acquires a negative polarity, and the comburent is fed to the cathode, which becomes viceversa positive. The evolution of electric energy in the most common systems of fuel cells, namely those cells which are fed with hydrogen and oxygen or with mixtures thereof, is quite interesting for the high efficiencies of the utilized fuel and for the very low, nearly negligible, negative effect on the environment (absence of harmful emissions and noise).

A schematic classification of fuel cells is typically based on the kind of electrolytes used to separate the anodic and cathodic compartments, and, as a consequence, on the range of temperatures they may be operated at. This kind of classification is directly reflected by the use that may be devised for said types of fuel cells.

In particular, fuel cells operating at high temperatures, i.e. above 200° C., are by now becoming an alternative electric energy source in large-size plants also for the interesting co-generation possibilities ensured by the high thermal level. On the contrary, in the field of low-temperature cells (25–200° C.), an increasing interest is focused on solid polymer electrolyte fuel cells, the negative and positive compartments of which are respectively fed with hydrogen (pure, or in admixture, produced by the catalytic conversion of a precursor thereof) and with pure oxygen, preferably with air.

Among the various advantages offered by these systems, particular attention is to be given to the extremely fast start-up, the nearly instantaneous ability to follow the required power variations, the high electric efficiency in a very wide field of supplied energy. For all these reasons, the very favorite application field of solid polymer electrolyte fuel cells is the small-size domestic supply of electric energy, small continuity power units, high efficiency energy-recoversion from hydrogen formed as a by-product in chemical and electrochemical plants, electric transport.

The typical embodiment of solid polymer electrolyte consists of ion-exchange membranes, characterized by a high ionic conductivity. This kind of electrolyte had been developed as an alternative to the more traditional acidic or alkaline solutions (e.g. orthophosphoric acid or potassium hydroxide) to solve the problems connected with the utilization of liquid electrolytes which, although typically contained in porous matrixes, pose serious limitations due to instantaneous pressure unbalances between the two compartment. Furthermore, as said electrolytes are quite corrosive, extremely expensive construction materials are needed.

The main drawback initially faced in the field of polymeric ion exchange membrane fuel cells was the difficulty of providing for a perfect electrical continuity between the membrane area where electric current is transported by a positive charge carrier (the $H^+$ ion) and the two electrodic surfaces, from which on electric conductivity is ensured by the electron flow. The charge passage between the two carriers takes place on the catalyst particles which activate the electrode by means of the anodic and cathodic reactions.

In the typical case of a cell having the anode fed with a mixture containing hydrogen as the fuel and the cathode fed with a mixture containing oxygen, the reactions are respectively:

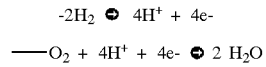

To obtain a very effective device, the contact points between the catalyst particles and the membrane must be easily reached by the gaseous reactants. For this purpose, the electrodes contain a hydrophobic agent, (such as polytetrafluoro-ethylene P.T.F.E.) which permits to locally segregate the water produced by the cathodic reaction leaving free access to the gas. Only the points where the contact between membrane and catalyst and concurrently the access of the reactants are ensured are efficient reactions sites.

The first solution found in the prior art to maximize these contact points foresaw the use of a high quantity of catalyst on the two sides of the membrane (typically 40–50 grams per square meter of membrane on each side). Platinum black is the only catalyst capable of ensuring a sufficient efficiency for industrial applications. However the cost of this material was prohibitive hindering completely the industrial development of this technology. For comparison sake it must be noted that the closest fuel cell technology, using phosphoric acid embedded in a matrix as the electrolyte, uses platinum loads ten times lower. The most commonly used electrodes in phosphoric acid fuel cells are activated by a catalyst consisting of platinum supported on active carbon particles, applied to a substrate made of an electrically conductive thin carbon cloth. These electrodes, commercialized by E-TEK, U.S.A. under the trademark ELAT™, are described in U.S. Pat. No. 4,647,359. ELAT™ electrodes are specifically intended for use in phosphoric acid fuel cells. The carbon cloth acting as the substrate in fact is activated on one side with a mixture of catalyst and a hydrophobic agent and on the other side with conductive carbon also mixed with a hydrophobic agent in order to physically constrain the electrolyte inside the porous supporting matrix, as already described. The electrode described in U.S. Pat. No. 4,647,359 foresees a distribution of the hydrophobic binder completely unsuitable for use in polymeric ion exchange membrane fuel cells.

First of all this configuration foresees a hydrophobic surface opposed to the active surface facing the membrane. This is due, as aforesaid, to the need of constraining the liquid electrode inside the porous matrix but is completely useless in the case of a solid electrolyte as it introduces without any need an additional ohmic penalty. Furthermore in mass-production, it would be disadvantageous to activate both surfaces as this introduces a superfluous complication in an automated fabrication process. The method described in U.S. Pat. No. 4,647,359 foresees also that the active surface of the electrode comprise a uniform mixture of catalyst and hydrophobic binder. This involves the loss of a remarkable quantity of catalyst inside the roughness of the substrate.

U.S. Pat. No. 4,876,115 describes the use of ELAT™ electrodes also in membrane fuel cells. The invention consists in impregnating the active surface of the electrodes with a protonic conductive liquid thus creating a tridimensional reaction zone which practically extends the membrane phase beyond the more external surface of the electrode, increasing thereby the platinum exploitation of one order of magnitude. A subsequent stage consisting in heat pressing the electrode on the membrane, as described in U.S. Pat. No. 3,134,697, permits to obtain a membrane-electrode assembly having the same electrochemical properties as the electrodes having a higher platinum content of the prior art. The typical noble metal load required for the best performance of electrodes in membrane fuel cells is reduced to 5 grams per square meter of active surface. Thanks to this invention, the ELAT™ electrode found a quick application in this field, although it was not originally conceived for this aim.

The combination of these two techniques, which in principle gives to the membrane-electrode assembly the desired electrochemical characteristics, is however not completely satisfactory from an industrial standpoint. In particular, heat pressing of the two electrodes on the solid electrolyte is a very expensive procedure due to the problems connected with its automation. In fact each membrane-electrode assembly must be subjected to heat and pressure for a time sufficient to cause the intimate contact among the components, which time is usually in the range of some minutes. Further the temperature must necessarily exceed 100° C. with a relative humidity close to 100%, otherwise membranes suitable for use in any fuel cell presently commercialized or described in the literature would undergo an irreversible decay. The high cost of the necessary components makes unacceptable to discard defective assemblies which are unavoidable in mass-production wherein several parameters (times, temperatures, pressures, relative humidity) must be kept within very strict tolerance limits. In addition, membranes undergo remarkable expansion under the thermal cycle and the variations of the relative humidity. Conversely the electrodes are practically dimensionally stable. This causes dangerous stresses at the interface involving possible damages to the heat-pressed assemblies, which must be kept under strictly controlled conditions before assembling in the cell, thus adding to the process costs.

These drawbacks, which substantially hindered industrial success for the solid polymer electrolyte fuel cells have been overcome by the assembly described in U.S. Pat. No. 5,482,792 which describes assembling of a cell wherein the heat-pressing of the membrane-electrodes assembly is carried out in situ, after stacking of the single components, thanks to the use of a current collector exhibiting residual deformability. This current collector provides for a homogeneous distribution of the contact points at the same time evenly distributing the pressure exerted by the clamping of the cells on both electrodes in a close point-pattern.

It is the main object of the present invention to improve the prior art electrodes comprising a thin, porous conductive substrate and devised for the application in liquid electrolyte cells, by modifying the characteristics to make them perfectly suitable for application in solid polymer electrolyte cells. In particular, the present invention consists in activating only one side of said thin, porous conductive substrate with a pre-layer comprising a conductive carbon having a low surface area and a first hydrophobic agent and subsequently superimposing a catalytic layer comprising platinum supported on conductive carbon having a high surface area, mixed to a second hydrophobic agent, and adjusting the degree of hydrophobicity of the applied layers in order to obtain an optimum exploitation of the catalyst.

For an optimization of the electrochemical characteristics of the electrodes for polymer fuel cells the following goals are to be achieved:

maximum increase of the active contact area between catalyst and proton conductor, that is the number of catalytic particles simultaneously in contact with the membrane and efficaciously fed by the gaseous reactants;

best water balance to the membrane-electrode assembly, to completely hydrate the electrolyte in order to ensure a perfect electrical conductivity without causing an excessive water load in the catalytic particles, which would prevent the reactants access.

It has been surprisingly found that it is extremely advantageous to distribute the hydrophobic binder in a decreasing degree between the inside and the outside of the cathode, while no similar result is obtained at the anode. Different treatments have been consequently applied to the cathode and anode and for each one the best formulation has been devised. In both cases, a pre-layer of conductive carbon having a low surface area mixed to a hydrophobic binder has been first applied to the substrate. Said pre-layer is aimed at both giving the required hydrophobic characteristics to the electrode, and at substantially filling the substrate roughness in order to obtain an extremely even surface. A catalytic layer comprising a platinum-based catalyst supported on a carbon having a high surface area, mixed to a second hydrophobic agent has been then applied to the substrate obtained as previously described. The platinum/carbon ratio in the catalyst has been modified in order to expose the largest surface of platinum. With catalysts having excessively dispersed platinum, in fact, when the quantity of noble metal is applied, thicker catalytic layers are obtained which may lead to the risk of having a high quantity of platinum hidden in too deep layers, for which no contiguity can be attained with the membrane. Catalysts with too concentrated platinum, on the contrary, present a too reduced specific surface (that is related to the weight of the applied metal).

In the application in fuel cells fed with non-pure hydrogen, the platinum is often deactivated due to poisoning. In these cases significant advantages are obtained by the activation of the fuel cell anode with catalysts containing platinum as platinum alloy. For example, the modifications to the ratio platinum/carbon in terms of weight are also extended to the binary platinum-ruthenium alloy.

The following examples show that:

the optimum noble metal dispersion on carbon, both in the case of pure platinum or alloy thereof, is comprised in the range of 30–40% by weight.

the optimum P.T.F.E. concentration in the cathodic pre-layer ranges from 50 to 65% by weight.

The optimum P.T.F.E. concentration in the anodic pre-layer is comprised between 15 and 25% by weight.

The optimum P.T.F.E. concentration in both anodic and cathodic catalytic layer is comprised in the range of 10–20% by weight. Preferably, the anode and/or cathode are subjected to an additional thermal treatment above 300° C.

EXAMPLE

Some samples of electrodes for use in fuel cells have been prepared according to the following procedure:

—an aqueous dispersion of the pre-layer components was applied to the substrate surface and dried at ambient temperature up to obtain a specific load of 25 grams of carbon per square meter;

—an aqueous dispersion of the catalytic layer components was subsequently applied to the pre-layer and dried at ambient temperature up to obtaining a specific load of 6 grams of noble metals per square meter;

—the thus activated substrate was thermally treated for 30 minutes at 350° C.

—a 5% hydroalcoholic suspension of perfluorinated sulphonated polymer, commercialized by Du Pont de Nemours under the trademark Nafion®, was applied to the activated substrate by brushing and subsequent drying at ambient temperature. The final load was 10 grams/m².

The substrates consisted alternatively of a conductive carbon cloth 0.35 mm thick (indicated in Table 1 as TC) or a reticulated nickel material, commercially known as "metal foam", completely flattened (indicated in Table 1 as SM).

Shawinigan Acetylene Black carbon and P.T.F.E. as the hydrophobic binder were used for the prelayer.

The same hydrophobic binder in combination with Pt supported on Vulcan XC-72 carbon was used for the catalytic layer.

The samples had the following characteristics:

TABLE 1

| Sample | Substrate type | P.T.F.E. in the pre-layer | P.T.F.E. in the catalytic layer | Nobel metal in the catalytic layer | % by weight of nobel metal on carbon in the catalytic layer |
|---|---|---|---|---|---|
| A | TC | 15% | 50% | Pt | 30% |
| B | TC | 30% | 50% | Pt | 30% |
| C | TC | 40% | 50% | Pt | 30% |
| D | TC | 50% | 50% | Pt | 30% |
| E | TC | 65% | 50% | Pt | 30% |
| F | SM | 50% | 50% | Pt | 30% |
| G | TC | 20% | 50% | Pt | 30% |
| H | TC | 25% | 50% | Pt | 30% |
| I | SM | 60% | 50% | Pt | 30% |
| J | TC | 70% | 50% | Pt | 30% |
| K | TC | 60% | 15% | Pt | 20% |
| L | TC | 60% | 15% | Pt | 40% |
| M | TC | 60% | 15% | Pt | 50% |
| N | TC | 60% | 15% | Pt | 70% |
| O | TC | 15% | 30% | Pt | 30% |
| P | TC | 15% | 10% | Pt | 30% |
| Q | TC | 15% | 20% | Pt | 30% |
| R | TC | 20% | 15% | Pt | 30% |
| S | TC | 60% | 25% | Pt | 30% |
| T | TC | 60% | 40% | Pt | 30% |
| U | TC | 60% | 10% | Pt | 30% |
| V | SM | 15% | 15% | Pt:Ru 1:1 | 30% |
| W | TC | 15% | 15% | Pt:Ru 1:1 | 50% |
| X | TC | 15% | 30% | Pt:Ru 1:1 | 50% |

Some samples of ELAT™ electrodes have been obtained from E-TEK, Inc., U.S.A.. The samples, prepared according to the teaching of U.S. Pat. No. 4,647,359, had a platinum load of 6 grams per square meter. A layer of liquid Nafion® was applied to the samples according to the same procedure used for the samples of Table 1. These additional samples have been identified by Y. A fuel cell having an active area of 25 cm² prepared according to the teachings of U.S. Pat. No. 5,482,792, with pure hydrogen fed at the anode and air fed to the cathode was alternatively equipped with the electrode samples of Table 1 in combination with a Nafion 117 membrane. All the tests were carried out at the same operating conditions and for a equal periods of 6 hours at 3 kA/m², The cell voltages were detected at the end of each test. The results are reported in Table 2.

TABLE 2

| Test N° | Anode | Cathode | Cell voltage at 3 kA/m² |
|---|---|---|---|
| 1 | Y | Y | 730 mV |
| 2 | D | D | 740 mV |
| 3 | F | F | 740 mV |
| 4 | A | D | 755 mV |
| 5 | B | D | 750 mV |
| 6 | C | D | 745 mV |
| 7 | J | D | 720 mV |
| 8 | G | D | 755 mV |
| 9 | H | D | 755 mV |
| 10 | A | B | 715 mV |
| 11 | A | C | 745 mV |
| 12 | A | E | 760 mV |
| 13 | A | I | 765 mV |
| 14 | A | J | 740 mV |
| 15 | O | E | 770 mV |
| 16 | P | E | 775 mV |
| 17 | Q | E | 775 mV |
| 18 | Q | S | 795 mV |
| 19 | Q | T | 780 mV |
| 20 | Q | U | 795 mV |
| 21 | Q | K | 760 mV |
| 22 | Q | L | 790 mV |
| 23 | Q | M | 775 mV |
| 24 | Q | N | 765 mV |
| 25 | V | U | 790 mV |
| 26 | W | U | 790 mV |
| 27 | X | U | 780 mV |

The foregoing description identifies the characterizing features of the invention and some applications thereof. Further applications are however possible for the described electrode structures and equivalent ones without departing from the scope of the present invention and should be included within the scope of the following claims.

We claim:

1. An anode for solid polymer electrolyte fuel cells, comprising an electroconductive porous and planar substrate coated on one side with a prelayer of carbon having a low surface area mixed with a first hydrophobic binder wherein the concentration of said binder is between 15 and 25% by weight and an outer catalytic layer formed by a catalyst mixed with a second hydrophobic binder wherein the catalyst is made of pure platinum or an alloy thereof dispersed on a high surface area carbon in a range of 30 to 40% by weight of noble metal and wherein the concentration of said hydrophobic binder is between 10 and 20% by weight.

2. The anode of claim 1 wherein the electroconductive substrate is made of carbon cloth.

3. The anode of claim 1 wherein the electroconductive substrate is made of metallic material.

4. The anode of claim 3 wherein the metallic material is a flattened metal foam.

5. The anode of claim 1 wherein said anode is subjected to an additional thermal treatment at a temperature above 300° C.

6. In a solid polymer electrolyte fuel cell provided with an anode and a cathode the improvement comprising using as the anode the anode of claim 1.

7. A solid polymer electrolyte fuel cell comprising a polymer ion exchange membrane in contact with an anode of claim 1 on one side and in contact with a cathode on the other side of the membrane, wherein the cathode has a prelayer of carbon having a low surface area mixed with a first hydrophobic binder wherein the concentration of said binder is between 50 and 65% by weight and an outer catalytic layer formed by a catalyst mixed with a second hydrophobic binder wherein the catalyst is made of pure platinum or an alloy thereof dispersed on a high surface area carbon in a range of 30 to 40% by weight of noble metal and wherein the concentration of said hydrophobic binder is between 10 and 20% by weight.

8. A cathode for solid polymer electrolyte fuel cells, comprising an electroconductive porous and planar substrate coated on one side with a prelayer of carbon having a low surface area mixed with a first hydrophobic binder wherein the concentration of said binder is between 50 and 65% by weight and an outer catalytic layer formed by a catalyst mixed with a second hydrophobic binder wherein the catalyst is made of pure platinum or an alloy thereof dispersed on a high surface area carbon in a range of 30 to 40% by weight of noble metal and wherein the concentration of said hydrophobic binder is between 10 and 20% by weight.

9. The cathode of claim 8 wherein the electroconductive substrate is made of carbon cloth.

10. The cathode of claim 8 wherein the electroconductive substrate is made of a metallic material.

11. The cathode of claim 10 wherein the metallic material is a flattened metal foam.

12. The cathode of claim 8 wherein said anode is subjected to an additional thermal treatment at a temperature above 300° C.

13. In a solid polymer electrolyte fuel cell comprising an anode and a cathode the improvement comprising using as a cathode the cathode of claim 8.

* * * * *